(12) United States Patent
Kinari et al.

(10) Patent No.: US 6,419,740 B2
(45) Date of Patent: Jul. 16, 2002

(54) WATER-PERMEABLE SOLID MATERIAL AND MANUFACTURING METHOD THEREFOR

(75) Inventors: Hisahide Kinari; Yutaka Ito, both of Osaka (JP)

(73) Assignee: Kabushiki Kaisha Kobe Seiko Sho., Kobe (JP)

(*) Notice: Subject to any disclaimer, the term of this patent is extended or adjusted under 35 U.S.C. 154(b) by 0 days.

(21) Appl. No.: 09/768,054

(22) Filed: Jan. 24, 2001

(30) Foreign Application Priority Data

Feb. 3, 2000 (JP) ........................................ 2000-032605

(51) Int. Cl.$^7$ ............................................... C04B 18/06
(52) U.S. Cl. .................................. 106/705; 106/DIG. 1
(58) Field of Search ............................ 106/705, DIG. 1

(56) References Cited

U.S. PATENT DOCUMENTS

| | | | |
|---|---|---|---|
| 4,040,852 A | * 8/1977 | Jones | |
| 4,917,733 A | * 4/1990 | Hanson | |
| 5,116,420 A | * 5/1992 | Schneider et al. | 106/640 |
| 5,294,255 A | * 3/1994 | Smetana et al. | 106/698 |
| 5,531,824 A | * 7/1996 | Burkes et al. | 106/737 |
| 5,772,751 A | * 6/1998 | Nisnervich et al. | 106/579 |
| 5,997,632 A | * 12/1999 | Styron | 106/705 |
| 6,241,815 B1 | * 6/2001 | Bonen | 106/735 |

FOREIGN PATENT DOCUMENTS

| | | | |
|---|---|---|---|
| JP | 61021940 | * | 1/1986 |
| JP | 63197602 | | 8/1988 |
| JP | 04182334 | * | 6/1992 |
| JP | 253092 | | 9/1996 |
| JP | 09025155 | | 1/1997 |
| ZM | 8709673 | * | 8/1988 |

\* cited by examiner

*Primary Examiner*—Paul Marcantoni

(57) ABSTRACT

A water-permeable solid material is provided having water-permeable properties together with strength for use as paving materials by effective use of so-called "clinker ash" generated from thermal power plants and the like. In addition, in order to prevent abrasions when pedestrians fall in the case in which a solid material is used as a paving material, a water-permeable solid material is provided having a smooth surface in which the surface irregularities is reduced as small as possible. Coal ash is used as an aggregate, and the particles of the coal ash are tightly bound with each other by a small amount of cement using the pozzolana property of the coal ash. In addition, an inorganic material is interposed between particles of the coal ash, which is used as an aggregate, so as to improve the strength while ensuring voids.

5 Claims, 1 Drawing Sheet

FIGURE
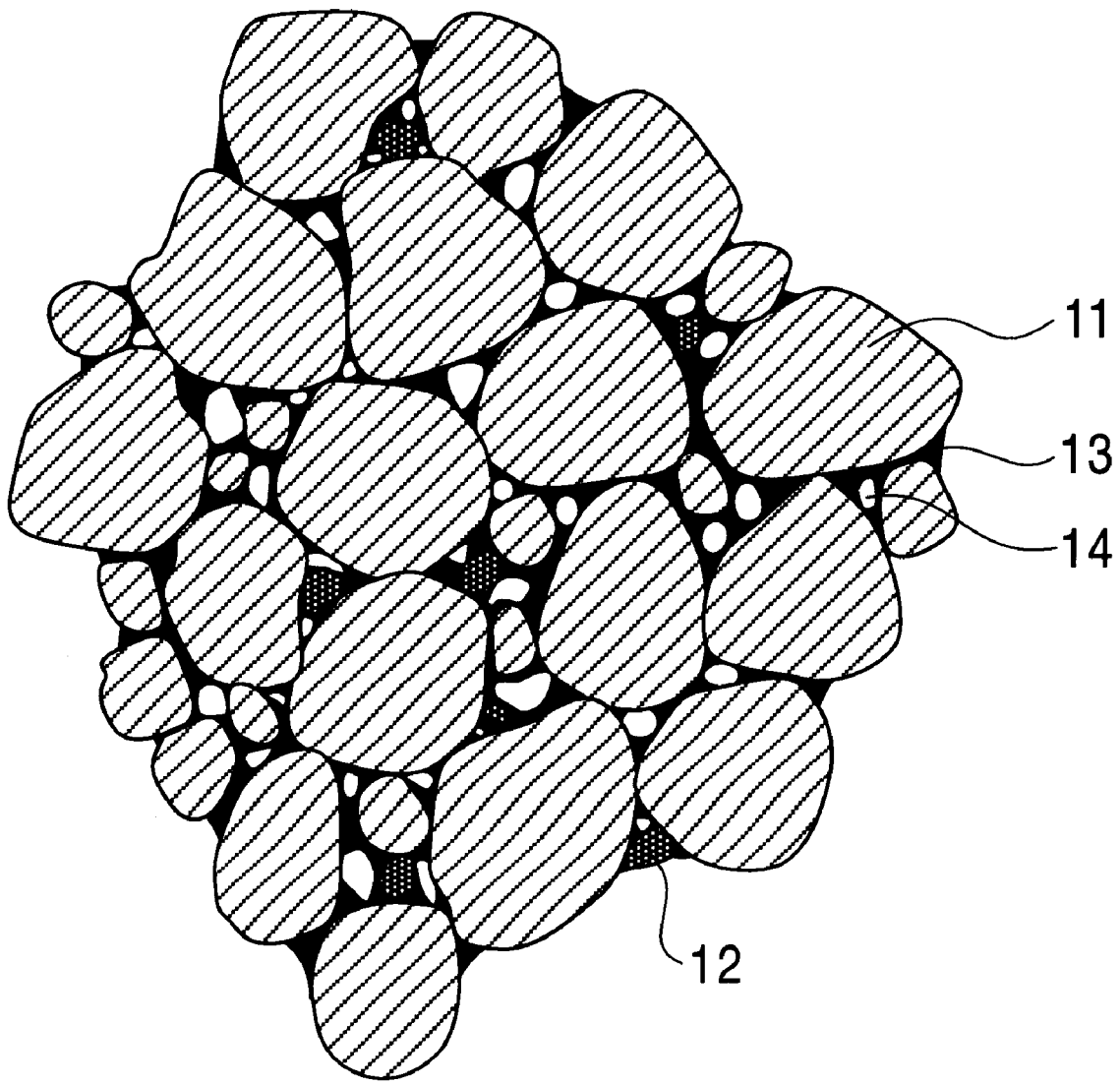

WATER-PERMEABLE SOLID MATERIAL AND MANUFACTURING METHOD THEREFOR

BACKGROUND OF THE INVENTION

1. Field of the Invention

The present invention relates to water-permeable solid materials used as paving materials for parks, recreation trails, roadways, parking lots, and the like.

2. Description of the Related Art

Recently, paving materials having water-permeable properties have drawn attention in view of the requirements for environmental conservation, and various types of paving materials are used in practice.

For example, a method for manufacturing water-permeable concrete is disclosed in Japanese Unexamined Patent Application Publication No. 10-194818 in which cement and water in a ratio of 1 to 0.25 is mixed, and the mixture thus formed is compounded with crushed rock of grade 7 (5 to 2.5 mm) and of grade 6 (13 to 5 mm), a binder, and a pigment, and the compound thus formed is caste on an area to be paved or is cured in a mold so as to yield water-permeable concrete.

However, in the method described above, since crushed rock is primarily used, the material cost is increased. In addition, since crushed rock does not always have the pozzolana property in which curing is performed in the presence of an alkaline material, the amount of cement added is larger compared to the case in which coal ash is used. As a result, the voids in the material are decreased, and hence, the water-permeable properties thereof are also degraded.

A method is disclosed in Japanese Unexamined Patent Application Publication No. 8-239281 in which pyroclast, 300 to 400 kg of cement to 1 m$^3$ of pyroclast (volcanic sand, volcanic ash, or volcanic rock), 0.005 to 0.1 part by weight of a binder which is generally used for mortar, and 0.3 to 0.4 part by weight of water, with respect to 1 part by weight of cement, are compounded, and the compound thus formed is cast on an area to be paved or is cured with pressure in a mold so as to yield water-permeable concrete.

In the method described above, since pyroclast (volcanic sand, volcanic ash, or volcanic rock) is primarily used, the material cost is reduced. However, it is believed that the binder used in the method was not appropriately selected, and as a result, satisfactory strength could not be obtained while ensuring the voids required for high water-permeable properties.

In addition, Japanese Unexamined Patent Application Publication No. 4-198049 discloses a water-permeable composition having an aggregate composed of finely powdered water cooled slag and at least one of crystallized slag, limestone, and water cooled slag, and 1 to 14 percent by weight of an alkaline agent such as cement or gypsum. In the composition described above, a binder is not contained.

In the method described above, cement, gypsum, or the like is used as an alkaline agent which is used for binding the aggregate. Accordingly, the solidification is performed only by the reaction of the alkaline agent mentioned above, and as a result, a composition having water-permeable properties together with strength cannot be obtained.

Recently, the large amount of coal ash generated from thermal power plants and the like has been increasing; in particular, so-called "clinker ash" generated at the bottoms of boilers is increasing since appropriate disposal methods therefor have not been developed, and hence, the promotion of effective use of the coal ash is progressively required. In response to the requirements mentioned above, a method for using coal ash, which is generated in large amounts, for water-permeable paving materials as described above is disclosed in Japanese Unexamined Patent Application Publication No. 2-271952. In the method mentioned above, 100 parts by weight of white cement, 100 to 500 parts by weight of coal ash clinker, and 10 to 20 parts by weight of a cement curing agent are mixed, water is then added to the mixture thus formed, and subsequently, the mixture is molded and dried by a roller compacting method so as to form products for civil engineering purposes.

However, in the products for civil engineering purposes formed in accordance with the method disclosed in Japanese Unexamined Patent Application Publication No. 2-271952, the solidification is performed only by the reaction of the cement, and the pozzolana property of the coal ash is not effectively exploited. In addition, since a large amount of cement is used in order to ensure strength, even though it is not clear since the particular water-permeability thereof is not described, it is believed that the voids formed in the material are decreased and that the water-permeability is low.

SUMMARY OF THE INVENTION

Accordingly, an object of the present invention is to provide a water-permeable solid material having sufficient water-permeable properties together with sufficient strength for use in paving materials by effective use of so-called "clinker ash" generated from thermal power plants and the like. In addition, in order to minimize abrasions when pedestrians fall in the case in which a solid material is used as a paving material, another object of the present invention is to provide a water-permeable solid material in which the surface thereof is flat and small surface irregularities are reduced to be as small as possible.

In order to solve the problems described above, by intensive research by the inventors of the present invention, it was discovered that when clinker ash was used as an aggregate, the particles of the clinker ash could be bound with each other by a small amount of cement using the pozzolana property of the clinker ash. In addition, it was also discovered that when an inorganic material was interposed between the particles of the clinker ash used as the aggregate, the strength was not degraded even if the amount of cement is reduced. Accordingly, it was discovered that a water-permeable solid material could be formed having a predetermined water-permeable properties together with a predetermined strength while voids formed between particles of the clinker ash could be ensured, whereby the present invention was made.

That is, a water-permeable solid material of the present invention is produced by a process comprising the steps of preparing a mixture primarily composed of 9 to 30 parts by weight of cement and 2 to 7 parts by weight of an inorganic additive with respect to 100 parts by weight of clinker ash, compounding the mixture with water, and curing the mixture compounded with water.

When the water-permeable solid material has the composition described above, even though the amount of the cement is small, the particles of the clinker ash can be tightly bound with each other by using the pozzolana property of the clinker ash. The particles of the clinker ash are bound with each other at contacting points therebetween by the cement, the additive intrudes into some of the voids formed by the particles of the clinker ash, and the additive and the cement cross-link the particles of the clinker ash, whereby a bound state of the clinker ash can be obtained. As a result, compared to the case in which only clinker ash is used, the contacting points between particles of the clinker ash are increased by the additive intruded therebetween, and the particles of the clinker ash are tightly bound with each other compared to the case in which the additive is not used. In addition, a high strength can be obtained while the voids formed by the particles of the clinker ash are ensured. In the composition described above, 9 to 30 parts by weight of cement and 2 to 7 parts by weight of an additive with respect to 100 parts by weight of clinker ash mean that there are 9 to 30 g of cement and 2 to 7 g of an additive with respect to 100 g of clinker ash.

BRIEF DESCRIPTION OF THE DRAWINGS

FIG. 1 is a schematic expanded view showing a water-permeable solid material according to the present invention.

DETAILED DESCRIPTION OF THE INVENTION

In the present invention described above, when the amount of cement is less than 9 parts by weight with respect to 100 parts by weight of the clinker ash, a satisfactory strength cannot be obtained as paving materials. In contrast, when the amount of cement exceeds 30 parts by weight, sufficient number of voids is difficult to ensure, and hence, it is not preferable since satisfactory water-permeable properties cannot be obtained.

When the amount of additive is less than 2 parts by weight with respect to 100 parts by weight of the clinker ash, the effect obtained by addition of the additive is not significant, that is, the strength is not significantly improved compared to the case in which the additive is not used. In contrast, when the amount of additive exceeds 7 parts by weight, the voids are filled therewith, and hence, it is not preferable since the water-permeable properties are degraded.

When the amount of water added is excessive, it is not preferable since the viscosity of the cement is decreased, the voids are filled with the cement, and the curing occurs without forming the voids. Accordingly, the amount of water added is preferably 28 parts by weight or less.

Since clinker ash is generally formed by cooling using water, a certain amount of water is contained therein. Accordingly, a lower limit of the amount of water added is not particularly specified, and even though the amount of water added is zero, the primal components are compounded with water which is contained therein, whereby a water-permeable solid material according to the present invention can be obtained. For all that, the addition of 3 parts by weight or more of water is practically preferable.

In the present invention, the pozzolana property of clinker ash is a property in which clinker ash reacts with potassium hydroxide, which is liberated when cement is cured, so as to form a material which is substantially insoluble in water and which has a strength which is improved by curing. In particular, in the present invention, the pozzolana property is defined as a property to form a coal silicate hydride in the case described above. In addition, in the present invention, a satisfactory strength for paving materials is defined to be 150 kg/cm$^2$ or more as a compressive strength.

The additive intrudes into the voids formed by the particles of the clinker ash and cross-links the particles therebetween, whereby the particles of the clinker ash are bound with each other. As a result, compared to the case in which only the clinker ash is used, since contacting points between particles of the clinker ash are increased by the additive intruded therebetween, the particles of the clinker ash are tightly bound with each other compared to the case in which the additive is not used. In addition, a high strength can be obtained while ensuring the voids formed by the particles of the clinker ash.

In the water-permeable solid material according to the present invention described above, the additive is preferably at least one selected from the group consisting of fine clay, bentonite, kaolin, talc, and water glass.

That is, the additive to be used preferably has an ability to tightly bind particles of the clinker ash each other, and for example, as preferable additives, there may be mentioned silica-alumina-based baked powder, i.e., so-called "fine clay", and inorganic materials, such as bentonite, kaolin, talc, and water glass. These are preferably used alone or in combination.

In the water-permeable solid material according to the present invention described above, the particle size of the clinker ash, which is one of the primal components, is preferably 10 mm or less, and more preferably, 0.3 to 10 mm, and the water-permeability of the water-permeable solid material is preferably 0.01 cm/second or more.

In the water-permeable solid material according to the present invention described above, the particle size of the clinker ash, which is one of the primal components, is even more preferably 2 to 6 mm, the water-permeability of the water-permeable solid material is more preferably 0.1 cm/second or more, and the water-permeable solid material preferably has a smooth surface, i.e., small surface irregularities.

When the particle size of the clinker ash to be used is controlled, the number of voids can be controlled, and hence, the water-permeability can also be controlled. In addition, when the particle size distribution of the clinker ash is controlled to be uniform, a water-permeable solid material can be obtained having a smooth surface, i.e., small surface irregularities.

A water-permeable solid material according to another embodiment of the present invention comprises a first water-permeable layer primarily composed of 100 parts by weight of clinker ash having a particle size of 10 mm or less, 9 to 30 parts by weight of cement, and 2 to 7 parts by weight of an inorganic additive, and a second water-permeable layer provided on the first layer, which is primarily composed of 100 parts by weight of clinker ash having a particle size of 2 to 6 mm, 9 to 30 parts by weight of cement, and 2 to 7 parts by weight of an inorganic additive, so that the surface of the water-permeable solid material is flat and has small surface irregularities.

Since the water-permeable solid material described above has a two-layer laminated structure in which the layer composed of a material having a uniform particle size distribution is formed as an upper layer, and the layer composed of a material having a nonuniform particle size distribution is formed as a lower layer, a paved road can be provided in which the surface thereof is flat and has small surface irregularities, and water puddles are unlikely to form on the surface. Accordingly, traffic not only of pedestrians but also of wheelchairs and bicycles can be facilitated.

The measurement of the water-permeability is performed in accordance with the test methods for permeability of saturated soils described in Japan Industrial Standard (JIS) A 1218.

The additive to be used preferably has an ability to tightly bind particles of the clinker ash each other, and for example, as preferable additives, there may be mentioned silica-alumina-based baked powder, i.e., so-called fine clay, and inorganic materials, such as bentonite, kaolin, talc, and water glass. These are preferably used alone or in combination.

A method for manufacturing a water-permeable solid material according to the present invention comprises a step of compounding 100 parts by weight of clinker ash, 9 to 30 parts by weight of cement, 2 to 7 parts by weight of an inorganic additive, and 28 parts by weight or less of water, and a step of casting the compound on an area to be paved or a step of curing the compound in a mold with pressure.

According to the method described above, strength can be obtained which is suitably used for pavements, the number of voids therein can be controlled, and as a result, a water-permeable solid material having superior water-permeable properties can be formed.

A method for manufacturing another water-permeable solid material according to the present invention comprises a first step of compounding 100 parts by weight of clinker ash having a particle size of 10 mm or less, 9 to 30 parts by weight of cement, 2 to 7 parts by weight of an inorganic additive, and 28 parts by weight or less of water, one of a second step of casting the compound on an area to be paved and a third step of curing the compound in a mold with pressure so as to form a first water-permeable layer, a fourth step of compounding 100 parts by weight of clinker ash having a particle size of 2 to 6 mm, 9 to 30 parts by weight of cement, 2 to 7 parts by weight of an inorganic additive, and 28 parts by weight or less of water, and before the first water-permeable layer is fully cured, one of a fifth step of casting the compound formed in the fourth step on the surface of the first water-permeable layer and a sixth step of laminating a molded part formed by curing the compound formed in the fourth step in a mold with pressure on the first water-permeable layer.

According to the method described above, paving materials can be formed having flat surfaces and small surface irregularities, and in addition, abrasion or the like when pedestrians fall can be minimized in the case in which the paving materials are used. Furthermore, since the surface of the paving materials do not have small irregularities, even when a wheelchair passes, the wheel chair does not vibrate, and hence, smooth travel can be performed.

The reason the particle size of the clinker ash is preferably 10 mm or less is that when clinker ash having a particle size of more than 10 mm, the strength of the cured water-permeable solid material is degraded, and as a result, a satisfactory strength as a paving material is difficult to obtain. Accordingly, a mixture composed of 100 parts by weight of clinker ash having a particle size of 10 mm or less, 9 to 30 parts by weight of cement, 2 to 7 parts by weight of an additive, and 28 parts by weight or less of water is compounded, thereby yielding a starting material for the water-permeable solid material described above.

The cement used in the present invention is not particularly specified, fly ash, slag cement, and the like may be used. In particular, portland cement is preferably used since portland cement contains a large amount of calcium oxide which facilitates the cure of clinker ash by the pozzolana property. In addition, since fly ash can also be used, every type of coal ash generated from boilers of thermal power plants and the like can be effectively reused.

In addition, as the additives used in the present invention, as described above, silica-alumina-based baked powder, i.e., so-called "fine clay", and inorganic materials, such as bentonite, kaolin, talc, and water glass are preferably used. In particular, fine clay, bentonite, water glass, and the like are more preferable, and these are preferably used alone or in combination. The average particle size of the additive described above is preferably 100 $\mu$m or less.

In the present invention, the clinker ash having a particle size of 10 mm or less is clinker ash having particles which are allowed to pass through a mesh size of 10 mm by 10 mm. In addition, the clinker ash having a particle size of 2 to 6 mm is clinker ash having particles which are allowed to pass through a mesh size of 6 mm by 6 mm and are not allowed to pass through a mesh size of 2 by 2 mm.

Next, FIG. 1 is a schematic expanded view of a water-permeable solid material, in which coal ash, cement, and an additive are bound with each other by compounding and solidification. In the figure, reference numeral 11 indicates coal ash, i.e., clinker ash, reference numeral 12 indicates an additive, reference numeral 13 indicates cement, and reference numeral 14 indicates a void.

In FIG. 1, the particles of the coal ash 11 are bound with each other by the cement 13 at the contacting points between the particles. In this stage, the pozzolana reaction occurs by calcium hydroxide liberated by a hydration reaction of the cement 13, and as a result, the particles of the coal ash 11 are tightly bound with each other. In addition, since the curing is performed by the pozzolana reaction described above and the particles are bound with each other only at the contacting points therebetween, it is believed that the amount of the cement 13 can be reduced to be as small as possible. It is also believed that when the curing occurs, the cement 13 agglomerates at points in the vicinity of the contacting points between the particles of the coal ash 11, whereby the particles of the coal ash 11 are tightly bound with each other.

The additive 12 intrudes into the voids 14 formed by the particles of the coal ash 11 and is bound with the particles of the coal ash 11 so as to cross-link the particles thereof. In addition, the additive 12 is imposed in the cement 13. Accordingly, it is believed that, while a degree of solidification by the hydration reaction of the cement is reduced, the satisfactory strength is ensured, and the voids formed between the particles is also ensured.

According to the structure described above, even if an amount of the cement with respect to the aggregation, which is generally used in conventional types of water-permeable solid materials, is decreased, satisfactory strength thereof can be obtained. Consequently, coal ash can be effectively used, which is so-called "clinker ash" generated from the bottoms of boilers of thermal power plants and the like, for forming a water-permeable solid material having a high water-permeability and a satisfactory strength as a paving material.

In addition, after starting materials for the water-permeable solid material of the present invention are compounded with each other and are then cured in a mold with pressure, the molded water-permeable solid materials thus obtained are bedded on an entire area to be paved. Alternatively, the water-permeable solid material according to the present invention can be directly cast on an area to be paved so as to form pavements. Accordingly, since the water-permeable solid material is formed as described above, when clinker ash having a particle size of 10 mm or less, and more preferably, of 0.3 to 10 mm, is used, a paving material having water-permeability of 0.01 cm/second or more can be obtained. In addition, when clinker ash having a particle size of 2 to 6 mm is used, the water-permeability of the water-permeable solid material can be controlled to be 0.1 cm/second or more.

Furthermore, a two-layer laminated paving material can be formed in which a lower layer is composed of clinker ash having a particle size of 10 mm or less, and preferably, of 0.3 to 10 mm, or is composed of clinker ash which is prepared by removing clinker ash having a particle size of 2 to 6 mm by sieving from that having a particle size of 10 mm or less, and an upper layer is composed of clinker ash having a particle size of 2 to 6 mm. When the two-layer laminate is formed, the lower layer is first formed which is composed of clinker ash having a particle size of 10 mm or less, and preferably, of 0.3 to 10 mm, or is composed of clinker ash which is prepared by removing clinker ash having a particle size of 2 to 6 mm by sieving from that having a particle size of 10 mm or less, and preferably, of 0.3 to 10 mm. Subsequently, before the lower layer is fully cured, the upper layer is formed thereon which is composed of clinker ash having a particle size of 2 to 6 mm, and as a result, a two-layer laminate can be obtained in which the two layers are tightly bound with each other so as not to be separated therebetween. When the two-layer laminate is formed, water puddles are not likely to form on the surface thereof, and the surface thereof can be flat and the small surface irregularities can be reduced. Accordingly, travel of pedestrians, wheelchairs, and the like can be smoothly performed. In addition, pavement can be obtained in which pedestrians are rarely injured even when they fall.

size of 10 mm or less, a lower layer composed of the remaining coal ash A, which was prepared from the coal ash A after the coal ash C was removed therefrom by sieving, was formed at a lower portion, and an upper layer composed of the coal ash C having a finer particle size was formed on the lower layer before the lower layer was fully cured, thereby yielding a two-layer laminated water-permeable solid material. The thicknesses of the upper layer and the lower layer were 15 and 85 mm, respectively.

Strength Measurement

In consideration of the use for paving materials, the compressive strengths of water-permeable solid materials aged 28 days were measured.

Measurement of Water-Permeability

The measurement of water-permeability was performed in accordance with the test methods for permeability of saturated soils described in Japan Industrial Standard (JIS) A 1218, as described above.

The results of the strength, water-permeability measurement, and observation of the surface states (surface irregularities) by visual inspection are shown in Table 1. In Table 1, ⊙ indicates a highly superior surface state (surface irregularities are very small), and ○ indicates a superior surface state (surface irregularities are small).

TABLE 1

| | Coal Ash | | Cement | Additive | Water | | Water-permeable | | Water in | |
| | Particle Size | Parts by Weight | (parts by weight) | (parts by weight) | (parts by weight) | Strength (kg/cm$^2$) | Coefficient (cm/sec) | Surface State | Coal Ash (%) | Additive |
| --- | --- | --- | --- | --- | --- | --- | --- | --- | --- | --- |
| Sample 1 | A | 100 | 24 | 5 | 28 | 165 | 0.03 | ○ | 0 | Fine Clay |
| Sample 2 | A | 100 | 24 | 3 | 28 | 165 | 0.05 | ○ | 0 | Fine Clay |
| Sample 3 | B | 100 | 24 | 7 | 28 | 160 | 0.1 | ○ | 0 | Fine Clay |
| Sample 4 | C | 100 | 24 | 5 | 28 | 150 | 0.2 | ⊙ | 0 | Fine Clay |
| Sample 5 | A | 100 | 12 | 5 | 28 | 150 | 0.08 | ○ | 0 | Fine Clay |
| Sample 6 | A | 100 | 30 | 5 | 28 | 170 | 0.01 | ○ | 0 | Fine Clay |
| Sample 7 | A–C | 100 | 24 | 5 | 28 | 160 | 0.01 | ⊙ | 0 | Fine Clay |
| Sample 8 | D | 100 | 24 | 5 | 28 | 150 | 0.2 | ⊙ | 0 | Bentonite |
| Sample 9 | A | 100 | 30 | 5 | 28 | 170 | 0.01 | ○ | 0 | Bentonite |
| Sample 10 | A | 100 | 24 | — | 28 | 160 | 0.001 | ○ | 0 | Fine Clay |
| Sample 11 | A | 100 | 24 | 9 | 28 | 170 | 0.008 | ○ | 0 | Fine Clay |
| Sample 12 | A | 100 | 7 | 3 | 28 | 90 | 0.08 | ○ | 0 | Fine Clay |
| Sample 13 | A | 100 | 36 | 5 | 28 | 200 | 0.001 | ○ | 0 | Fine Clay |

EXAMPLES

Coal ash, called "clinker ash", cement, an additive, and water in a ratio in accordance with compositions shown in Table 1 were compounded, and the compounds thus formed were charged in a mold 200×145×60 mm and were then cured at a pressure of 5 kg/cm$^2$ by a single axial compression molding machine, thereby yielding water-permeable solid materials for testing. As an additive, fine clay 100 μM or less in average particle diameter or bentonite 100 μm or less in average diameter was used. Concerning particle sizes of coal ash shown in Table 1, A indicates coal ash having a particle size of 10 mm or less, B indicates coal ash having a particle size of 0.3 to 10 mm, C indicates coal ash having a particle size of 4.0 to 5.7 mm, and D indicates coal ash having a particle size of 2.0 to 4.0 mm. In addition, in Sample 7, the coal ash C having a particle size of 4.0 to 5.7 mm was obtained by sieving from the coal ash A having a particle As can be seen from Table 1, the sample 4 using coal ash having a particle size of 4.0 to 5.7 mm had a flat surface and small surface irregularities, thereby yielding a water-permeable solid material having a smooth surface. In addition, since the particle size distribution of the sample 4 was approximately uniform, when compared to the sample 1 having the same composition as that of Sample 4, the water-permeability thereof was higher. As was the case with the sample 4, the sample composed of two layers of Sample 7 was a water-permeable solid material having a flat surface and small surface irregularities. Since the lower portion of the sample 7 was formed of the layer having low water-permeability, the water-permeability of the sample 7 was lower than that of the sample 4. In addition, the samples of Samples 8 and 9 containing bentonite as an additive even had water-permeabilities and strengths, which were equivalent to those obtained by using fine clay as an additive.

Furthermore, even when an additive was changed to other materials, such as water glass, the results obtained therefrom were equivalent to those obtained by using fine clay as an additive.

According to the present invention, a water-permeable solid material having superior water-permeable properties together with superior strength can be manufactured by effective use of so-called "clinker ash" generated from thermal power plants and the like, which have no appropriate disposal method therefor, and hence, the water-permeable solid materials have spreading applications, such as for paving materials.

What is claimed is:

1. A water-permeable solid material manufactured by a process consisting essentially of the steps of:

preparing a mixture comprising 100 parts by weight of an inorganic additive;

compounding the mixture with water; and curing the mixture compounded with water, wherein a particle size of the clinker ash is 2 to 6 mm, and a water-permeability thereof is at least 0.1 cm/second.

2. A water-permeable solid material according to claim 1, wherein the inorganic additive comprises at least one selected form the group consisting of fine clay, talc, and water glass.

3. A water-permeable solid material consisting essentially of:

a first water-permeable layer comprising 100 parts by weight of clinker ash having a uniform particle size of 10 mm or less, 9 to 30 parts by weight of cement, and 2 to 7 parts by weight of an inorganic additive; and a second water-permeable layer provided by the first layer, which comprises 100 parts by weight of clinker ash having non-uniform particle sizes of 2 to 6 mm, 9 to 30 parts by weight of cement, and 2 to 7 parts by weight of an inorganic additive, so that the surface of the water-permeable solid material is flat and substantially regular.

4. A water-permeable solid material according to claim 2, wherein the fine clay includes at least one of bentonite and kaolin.

5. A water-permeable solid material manufactured by a process consisting essentially of the steps of:

preparing a mixture consisting essentially of 100 parts by weight of clinker ash, 9 to 30 parts by weight of cement, and 2 to 7 parts by weight of an inorganic additive;

compounding the mixture with water; and curing the mixture compounded with water.

\* \* \* \* \*